United States Patent
Mark et al.

(10) Patent No.: US 10,885,586 B2
(45) Date of Patent: Jan. 5, 2021

(54) METHODS FOR AUTOMATICALLY GENERATING STRUCTURED PRICING MODELS FROM UNSTRUCTURED MULTI-CHANNEL COMMUNICATIONS AND DEVICES THEREOF

(71) Applicant: JPMorgan Chase Bank, N.A., New York, NY (US)

(72) Inventors: Jimmy C. Mark, Hoboken, NJ (US); Sudhir Upadhyay, Edison, NJ (US); David Voell, Little Silver, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 1 day.

(21) Appl. No.: 16/031,742

(22) Filed: Jul. 10, 2018

(65) Prior Publication Data
US 2019/0057450 A1   Feb. 21, 2019

Related U.S. Application Data

(60) Provisional application No. 62/536,120, filed on Jul. 24, 2017.

(51) Int. Cl.
*G06Q 40/06* (2012.01)
*G06N 20/00* (2019.01)
(Continued)

(52) U.S. Cl.
CPC ........... *G06Q 40/06* (2013.01); *G06F 40/117* (2020.01); *G06F 40/284* (2020.01); *G06F 40/40* (2020.01); *G06N 20/00* (2019.01)

(58) Field of Classification Search
CPC ...... G06Q 40/06; G06N 20/00; G06F 17/218; G06F 17/277; G06F 17/28; G06F 16/24522; G06F 16/3329
See application file for complete search history.

(56) References Cited

U.S. PATENT DOCUMENTS 7,330,826 B1 * 2/2008 Porat .................. G06Q 30/0601
                                                      705/26.3
8,112,343 B1 * 2/2012 Exner .................. G06Q 40/025
                                                      705/36 R
(Continued)

OTHER PUBLICATIONS

Robert P. Schumaker and Hsinchun Chen, "Textual Analysis of Stock Market Prediction Using Breaking Financial News: The AZFinText System" dated Mar. 2009 https://dl.acm.org/doi/abs/10.1145/1462198.1462204 (Year: 2009).*

(Continued)

*Primary Examiner* — Bennett M Sigmond
*Assistant Examiner* — Raven E Zeer
(74) *Attorney, Agent, or Firm* — Greenblum & Bernstein, P.L.C.

(57) ABSTRACT

Methods, non-transitory computer readable media, and natural language understanding (NLU) service device are disclosed that receive raw requests for price quotes for financial instruments from two or more different types of communication channels and via one or more communication networks. The raw requests are in two or more different formats and comprise unstructured data. The unstructured data of the raw requests is analyzed to identify key value(s) associated with the raw requests. The raw requests are then automatically transformed based on the identified key value(s) into price quote request(s) comprising structured data in particular format(s) required by pricing application(s) hosted by pricing server device(s). The price quote request(s) are output to one or more of the pricing application(s) via another one or more communication networks in order to facilitate automated pricing of the financial instruments.

15 Claims, 4 Drawing Sheets

(51) Int. Cl.
*G06F 40/40* (2020.01)
*G06F 40/117* (2020.01)
*G06F 40/284* (2020.01)

(56) References Cited

U.S. PATENT DOCUMENTS

| | | | | |
|---|---|---|---|---|
| 8,204,809 | B1* | 6/2012 | Wise | G06Q 40/06 705/35 |
| 9,812,151 | B1* | 11/2017 | Amini | G10L 15/26 |
| 9,916,348 | B1* | 3/2018 | Madhavan | G06F 16/245 |
| 10,387,952 | B1* | 8/2019 | Sandhu | G06Q 40/04 |
| 2002/0135567 | A1* | 9/2002 | Chan | G06F 16/24522 345/169 |
| 2003/0135445 | A1* | 7/2003 | Herz | G06Q 40/04 705/37 |
| 2004/0024662 | A1* | 2/2004 | Gray | G06Q 10/0875 705/29 |
| 2005/0043940 | A1* | 2/2005 | Elder | G06F 16/24522 704/9 |
| 2005/0165654 | A1* | 7/2005 | Westcott | G06Q 30/0625 705/26.4 |
| 2005/0278285 | A1* | 12/2005 | Cohen | G06F 16/24522 |
| 2006/0259442 | A1* | 11/2006 | Iqbal | G06Q 30/0283 705/400 |
| 2008/0162173 | A1* | 7/2008 | Pechenik | G06Q 10/10 705/52 |
| 2009/0024504 | A1* | 1/2009 | Lerman | G06Q 40/00 705/35 |
| 2009/0177568 | A1* | 7/2009 | Hodges | G06Q 40/04 705/35 |
| 2010/0010841 | A1* | 1/2010 | Cooper | G06Q 10/02 705/6 |
| 2010/0138282 | A1* | 6/2010 | Kannan | G06Q 10/06398 705/7.42 |
| 2010/0250582 | A1* | 9/2010 | Anderson | G06F 16/24522 707/769 |
| 2010/0312602 | A1* | 12/2010 | McLoughlin | G06F 16/248 705/7.34 |
| 2010/0332401 | A1* | 12/2010 | Prahlad | H04L 67/1095 705/80 |
| 2011/0251977 | A1* | 10/2011 | Cialowicz | G06Q 40/06 705/36 R |
| 2011/0307356 | A1* | 12/2011 | Wiesinger | G06F 16/36 705/27.1 |
| 2012/0078610 | A1* | 3/2012 | Sayal | G06F 40/279 704/9 |
| 2012/0323947 | A1* | 12/2012 | Bice | G06F 16/24522 707/760 |
| 2013/0166433 | A1* | 6/2013 | Pechenik | G06Q 10/10 705/37 |
| 2013/0311447 | A1* | 11/2013 | Liensberger | G06F 16/245 707/722 |
| 2014/0180728 | A1* | 6/2014 | Biddle | G06F 16/3329 705/4 |
| 2015/0032574 | A1* | 1/2015 | Calman | G06Q 30/0629 705/26.64 |
| 2015/0032581 | A1* | 1/2015 | Blackhurst | G06Q 40/12 705/30 |
| 2015/0081321 | A1* | 3/2015 | Jain | G06F 19/3456 705/2 |
| 2015/0081396 | A1* | 3/2015 | Miller | G06F 16/21 705/7.36 |
| 2015/0100416 | A1* | 4/2015 | Blackhurst | G06Q 30/0253 705/14.51 |
| 2015/0178744 | A1* | 6/2015 | Noyes | G06Q 30/0202 705/7.29 |
| 2015/0242944 | A1* | 8/2015 | Willard | G06Q 30/0284 705/5 |
| 2016/0048852 | A1* | 2/2016 | Beh | G06Q 30/0206 705/7.31 |
| 2016/0124951 | A1* | 5/2016 | Barker | G06F 40/284 706/12 |
| 2016/0292456 | A1* | 10/2016 | Dubey | G06F 16/21 |
| 2017/0103402 | A1* | 4/2017 | El-Diraby | G06N 5/04 |
| 2017/0193501 | A1* | 7/2017 | Cole | G06Q 20/357 |
| 2017/0195993 | A1* | 7/2017 | Cole | G06Q 40/02 |
| 2017/0293917 | A1* | 10/2017 | Dhurandhar | G06N 7/005 |
| 2018/0032576 | A1* | 2/2018 | Romero | G06F 16/24522 |
| 2018/0144385 | A1* | 5/2018 | Subramanya | G06Q 30/0627 |
| 2018/0182014 | A1* | 6/2018 | Cheng | H04L 67/18 |
| 2018/0255180 | A1* | 9/2018 | Goldberg | G06F 40/279 |
| 2018/0285960 | A1* | 10/2018 | Li | G06Q 30/0635 |
| 2018/0293640 | A1* | 10/2018 | Krappe | G06Q 30/0207 |
| 2018/0302682 | A1* | 10/2018 | Saxena | G06Q 50/01 |
| 2018/0315415 | A1* | 11/2018 | Mosley | G10L 15/063 |
| 2018/0336198 | A1* | 11/2018 | Zhong | G06N 7/005 |
| 2018/0349377 | A1* | 12/2018 | Verma | G06F 16/248 |
| 2019/0228015 | A1* | 7/2019 | Assia | G06Q 30/0282 |
| 2019/0237068 | A1* | 8/2019 | Canim | G06N 5/048 |
| 2019/0243831 | A1* | 8/2019 | Rumiantsau | G10L 15/26 |
| 2019/0259047 | A1* | 8/2019 | Bharti | G06Q 30/0204 |

OTHER PUBLICATIONS

Venkata Sasank Pagolu; Kamal Nayan Reddy; Ganapati Panda; and Babita Majhi, "Sentiment analysis of Twitter data for predicting stock market movements," dated Oct. 2016 https://ieeexplore.ieee.org/abstract/document/7955659 (Year: 2016).*

Michael Hagenau; Michael Liebmann; Markus Hedwig; and Dirk Neumann, "Automated News Reading: Stock Price Prediction Based on Financial News Using Context-Specific Features" dated Jan. 2012 https://ieeexplore.ieee.org/abstract/document/6149155 (Year: 2012).*

* cited by examiner

US 10,885,586 B2

METHODS FOR AUTOMATICALLY GENERATING STRUCTURED PRICING MODELS FROM UNSTRUCTURED MULTI-CHANNEL COMMUNICATIONS AND DEVICES THEREOF

CROSS-REFERENCE TO RELATED APPLICATION(S)

This application claims the benefit of U.S. Provisional Patent Application Ser. No. 62/536,120, filed Jul. 24, 2017, which is hereby incorporated by reference in its entirety.

FIELD

This technology generally relates to automated processing of unstructured data using improved modeling to reduce latency and, more particularly, to methods and devices for automatically generating structured pricing models from unstructured multi-channel communications.

BACKGROUND

In the current marketplace for financial products or instruments (e.g., over-the-counter (OTC) derivatives), clients contact dealers use a multitude of communications channels (e-mails, chat, and voice) in order to obtain pricing quotes. The various communication channels are associated with different communication and data formats including highly unstructured (e.g., voice and electronic chat messages) and semi-structured (e.g., electronic documents, spreadsheet files, portable data files (PDFs), images, and other electronic media) formats.

While the post-execution workflow is well-defined via protocols including Market Wire, Society for Worldwide Interbank Financial Telecommunication (SWIFT) messaging and clearing houses, the price discovery process for such financial instruments remains highly non-standardized. As a result, price quote requests, including customized derivatives with non-standard day count conventions and notional schedules, for example, require significant manual intervention and analysis, and have associated relatively long turnaround times, negatively impacting client satisfaction.

Accordingly, latency between receipt of a raw pricing request and the return of a price quote is currently significant due to the technical challenges in accurately and quickly interpreting unstructured data in the raw pricing requests that are received via different types of network communication channels. These technical challenges are particularly impactful for dealers during periods of increased volume in which the dealers are often unable to respond to raw pricing requests in a timely manner.

SUMMARY

A method for automatically generating structured pricing models from unstructured multi-channel communications implemented by natural language understanding (NLU) service device(s) includes receiving raw requests for price quotes for financial instruments from two or more different types of communication channels and via one or more communication networks. The raw requests are in two or more different formats and comprise unstructured data. The unstructured data of the raw requests is analyzed to identify key value(s) associated with the raw requests. The raw requests are then automatically transformed based on the identified key value(s) into price quote request(s) comprising structured data in particular format(s) required by pricing application(s) hosted by pricing server device(s). The price quote request(s) are output to one or more of the pricing application(s) via another one or more communication networks in order to facilitate automated pricing of the financial instruments.

An NLU service device including memory including programmed instructions stored thereon and processor(s) configured to be capable of executing the stored programmed instructions to receive raw requests for price quotes for financial instruments from two or more different types of communication channels and via one or more communication networks. The raw requests are in two or more different formats and comprise unstructured data. The unstructured data of the raw requests is analyzed to identify key value(s) associated with the raw requests. The raw requests are then automatically transformed based on the identified key value(s) into price quote request(s) comprising structured data in particular format(s) required by pricing application(s) hosted by pricing server device(s). The price quote request(s) are output to one or more of the pricing application(s) via another one or more communication networks in order to facilitate automated pricing of the financial instruments.

A non-transitory machine readable medium having stored thereon instructions for automatically generating structured pricing models from unstructured multi-channel communications includes executable code that, when executed by processor(s), causes the processor(s) to receive raw requests for price quotes for financial instruments from two or more different types of communication channels and via one or more communication networks. The raw requests are in two or more different formats and comprise unstructured data. The unstructured data of the raw requests is analyzed to identify key value(s) associated with the raw requests. The raw requests are then automatically transformed based on the identified key value(s) into price quote request(s) comprising structured data in particular format(s) required by pricing application(s) hosted by pricing server device(s). The price quote request(s) are output to one or more of the pricing application(s) via another one or more communication networks in order to facilitate automated pricing of the financial instruments.

This technology has a number of associated advantages including providing methods, non-transitory computer readable media, and NLU service devices that more efficiently and effectively generate structured pricing models from unstructured multi-channel communications. In particular, this technology advantageously utilizes the generated and maintained structured pricing models to improve accuracy and response time for pricing quotes responsive to raw pricing requests received as part of the unstructured multi-channel communications. Accordingly, this technology facilitates improved hit ratios and customer satisfaction, particular in periods of high raw pricing request volume.

DETAILED DESCRIPTION

Figure 1:
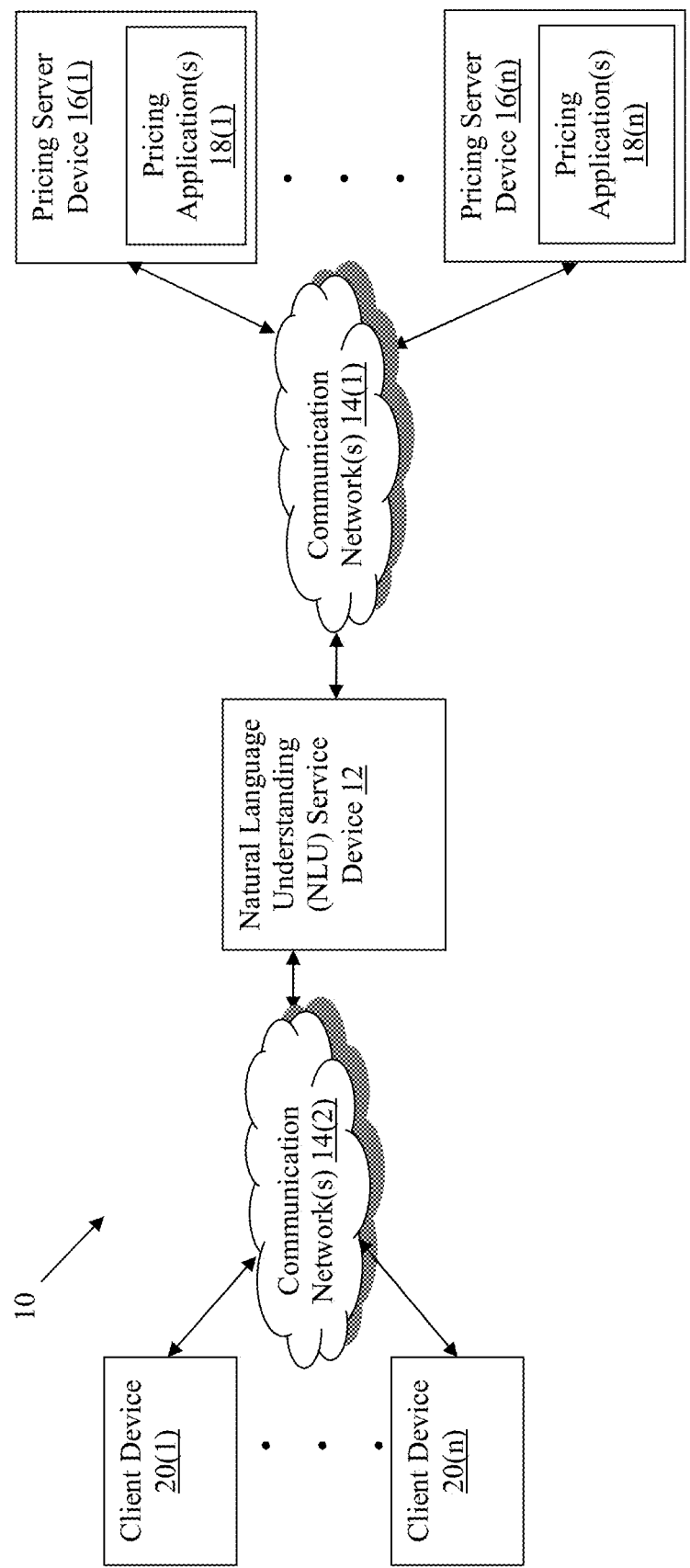
FIG. 1 is a block diagram of a network environment with an exemplary natural language understanding (NLU) service device.

Referring to FIG. 1, an exemplary network environment 10 with an exemplary natural language understanding (NLU) service device 12 is illustrated. The NLU service device 12 in this example is coupled, via communication network(s) 14(1), to a plurality of pricing server devices 16(1)-16(n) hosting pricing applications 18 (1)-18(n) and, via communication networks 14(2), a plurality of client devices 20(1)-20(n) via communication network(s) 14(2), although the NLU service device 12, pricing server devices 16(1)-16(n), and/or client devices 20(1)-20(n), may be coupled together via other topologies. Additionally, the network environment 10 may include other network devices such as one or more routers and/or switches, for example, which are well known in the art and thus will not be described herein. This technology provides a number of advantages including methods, non-transitory computer readable media, and NLU service devices that efficiently process raw pricing requests that include unstructured data to automatically facilitate price quote responses for financial instruments.

Figure 2:
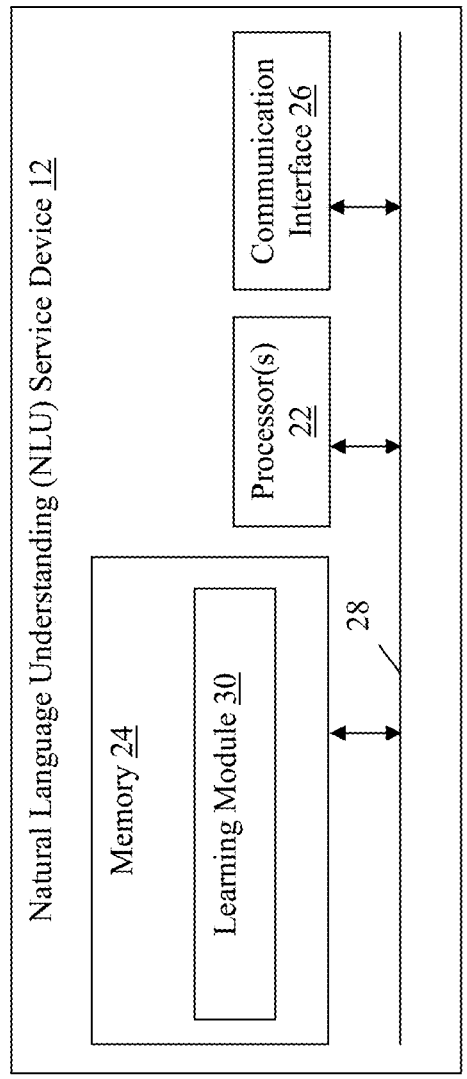
FIG. 2 is a block diagram of the exemplary NLU service device shown in FIG. 1.

Referring to FIGS. 1-2, the NLU service device 12 in this example includes one or more processors 22, a memory 24, and/or a communication interface 26, which are coupled together by a bus 28 or other communication link, although the NLU service device 12 can include other types and/or numbers of elements in other configurations. The processor(s) 22 of the NLU service device 12 may execute programmed instructions stored in the memory 24 for the any number of the functions described and illustrated herein. The processor(s) 22 of the NLU service device 12 may include one or more CPUs or general purpose processors with one or more processing cores, for example, although other types of processor(s) can also be used.

The memory 24 of the NLU service device 12 stores these programmed instructions for one or more aspects of the present technology as described and illustrated herein, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s) 22, can be used for the memory 24.

Figure 3:
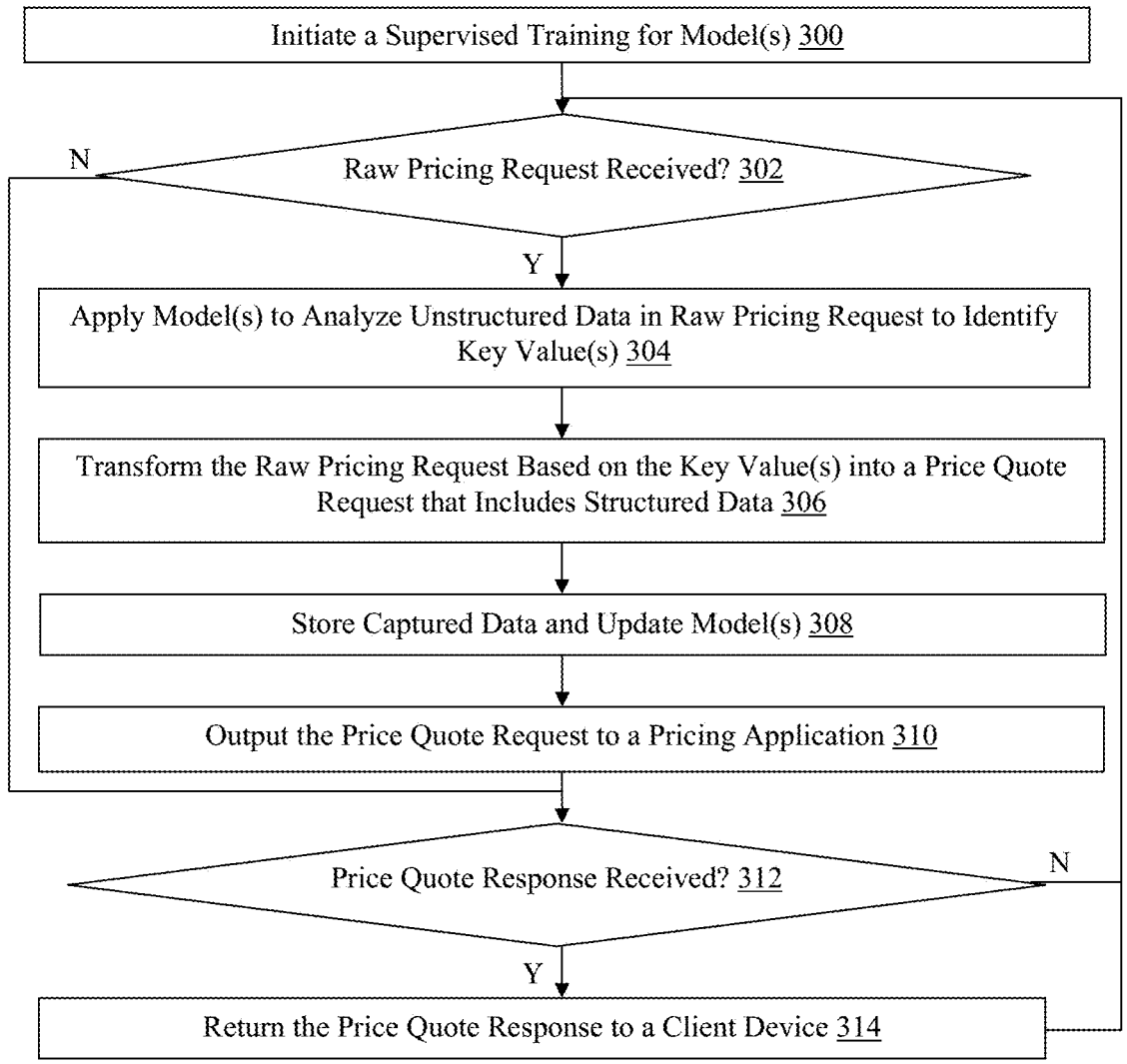
FIG. 3 is a flowchart of an exemplary method for automatically generating structured pricing models from unstructured multi-channel communications.

Accordingly, the memory 24 of the NLU service device 12 can store one or more applications that can include executable instructions that, when executed by the NLU service device 12, cause the NLU service device 12 to perform actions, such as to transmit, receive, or otherwise process network messages, for example, and to perform other actions described and illustrated below with reference to FIGS. 3-4. The application(s) can be implemented as modules or components of other applications. Further, the application(s) can be implemented as operating system extensions, module, plugins, or the like.

Even further, the application(s) may be operative in a cloud-based computing environment. The application(s) can be executed within or as virtual machine(s) or virtual server(s) that may be managed in a cloud-based computing environment. Also, the application(s), and even the NLU service device 12 itself, may be located in virtual server(s) running in a cloud-based computing environment rather than being tied to one or more specific physical network computing devices. Also, the application(s) may be running in one or more virtual machines (VMs) executing on the NLU service device 12. Additionally, in one or more embodiments of this technology, virtual machine(s) running on the NLU service device 12 may be managed or supervised by a hypervisor.

In this particular example, the memory 24 of the NLU service device 12 includes a learning module 30, although the memory 24 can include other policies, modules, databases, or applications, for example. The learning module 30 in this example is configured to facilitate transformation of unstructured data in raw pricing requests based on the application of model(s) maintained and updated by the learning module 30. By applying the models, the NLU service device 12 can extract raw pricing requests from other content (e.g., within a chat or e-mail message) and analyze the raw pricing requests to identify key values that are expected or required by one or more of the pricing application(s) 18(1)-18(n).

The learning module 30 can utilize machine and/or deep learning techniques and/or artificial markup (AIML) to train and/or update the model(s), although other types of learning techniques and methods can also be used. The learning module 30 can also maintain a persistent data store for captured data relating to prior processed raw pricing requests and associated results (e.g., whether the quote was "won" or resulted in a transaction by one of the client devices 20(1)-20(n)), although the captured data can be stored elsewhere in other examples.

The communication interface 26 of the NLU service device 12 operatively couples and communicates between the NLU service device 12, the pricing server devices 16(1)-16(n), and/or the client devices 20(1)-20(n), which are all coupled together by the communication network(s) 14(1) and 14(2), although other types and/or numbers of communication networks or systems with other types and/or numbers of connections and/or configurations to other devices and/or elements can also be used.

By way of example only, the communication network(s) 14(1) and 14(2) can include local area network(s) (LAN(s)) or wide area network(s) (WAN(s)), and can use TCP/IP over Ethernet and industry-standard protocols, although other types and/or numbers of protocols and/or communication networks can be used. The communication network(s) 14(1) and 14(2) in this example can employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), the Internet, intranets, and combinations thereof.

The NLU service device 12 can be a standalone device or integrated with one or more other devices or apparatuses, such as one or more of the pricing server devices 16(1)-16(n), for example. In one particular example, the NLU service device 12 can include or be hosted by one of the pricing server devices 16(1)-16(n), and other arrangements are also possible. Moreover, one or more of the devices of the NLU service device 12 can be in a same or a different communication network including one or more public, private, or cloud networks, for example.

Each of the pricing server devices 16(1)-16(n) in this example includes one or more processors, a memory, and a communication interface, which are coupled together by a bus or other communication link, although other numbers and/or types of network devices could be used. The pricing server devices 16(1)-16(n) in this example process structured price quote requests received from the NLU service device 12 via the communication network(s) 14(1) according to the HTTP-based and/or JavaScript Object Notation (JSON) protocol, for example, although other protocols can also be used.

The pricing server devices 16(1)-16(n) may be hardware or software or may represent a system with multiple servers in a pool, which may include internal or external networks. The pricing server devices 16(1)-16(n) may host pricing applications 18(1)-18(n) that are configured to process received price quote requests in a particular structured format and generate price quote responses that include price quotes for associated financial instruments.

Although the pricing server devices 16(1)-16(n) are illustrated as single devices, one or more actions of each of the pricing server devices 16(1)-16(n) may be distributed across one or more distinct network computing devices that together comprise one or more of the pricing server devices 16(1)-16(n). Moreover, the pricing server devices 16(1)-16(n) are not limited to a particular configuration. Thus, the pricing server devices 16(1)-16(n) may contain a plurality of network computing devices that operate using a master/slave approach, whereby one of the network computing devices of the pricing server devices 16(1)-16(n) operate to manage and/or otherwise coordinate operations of the other network computing devices.

The pricing server devices 16(1)-16(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The client devices 20(1)-20(n) in this example include any type of computing device that can facilitate the generation of raw pricing requests, such as in response to user interaction with graphical user interfaces (GUIs) for example. Accordingly, the client devices 20(1)-20(n) can be mobile computing devices, desktop computing devices, laptop computing devices, tablet computing devices, virtual machines (including cloud-based computers), or the like, that host chat, e-mail, or voice-to-text applications, for example. Each of the client devices 20(1)-20(n) in this example includes a processor, a memory, and a communication interface, which are coupled together by a bus or other communication link, although other numbers and/or types of network devices could be used.

The client devices 20(1)-20(n) may run interface applications, such as standard web browsers or standalone client applications, which may provide an interface to communicate with the NLU service device 12 via the communication network(s) 14(2) in order to communicate raw pricing requests. The client devices 20(1)-20(n) may further include a display device, such as a display screen or touchscreen, and/or an input device, such as a keyboard, for example.

Although the exemplary network environment 10 with the NLU service device 12, pricing server devices 16(1)-16(n), client devices 20(1)-20(n), and communication network(s) are described and illustrated herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 10, such as the NLU service device 12, client devices 20(1)-20(n), or pricing server devices 16(1)-16(n), for example, may be configured to operate as virtual instances on the same physical machine. In other words, one or more of the NLU service device 12, client devices 20(1)-20(n), or pricing server devices 16(1)-16(n) may operate on the same physical device rather than as separate devices communicating through communication network(s) 14(1) and/or 14(2). Additionally, there may be more or fewer NLU service devices, client devices, or pricing server devices than illustrated in FIG. 1.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

An exemplary method of automatically generating structured pricing models from unstructured multi-channel communications will now be described with reference to FIGS. 1-4. Referring more specifically to FIG. 3, in step 300 in this example, the NLU service device 12 initiates a supervised training for model(s) stored by the learning module 30. The model(s) facilitate the analysis of unstructured data included in raw pricing requests, and the transformation of the requests into structured price quote requests. To facilitate supervised training, artificial intelligence, machine and/or deep learning techniques (e.g., scki-kit learn or tensorflow), artificial markup (AIML), Stanford natural language processing (NLP), and/or natural language tool kit (NLTK) can be used, although other types of learning techniques can also be used to facilitate supervised training of the model(s) in other examples.

In step 302, the NLU service device 12 determines whether a raw pricing request is received from one of the client devices 20(1)-20(n). One or more of the client devices 20(1)-20(n) can be associated with chat or e-mail bots or a voice-to-text service that converts voice-based raw pricing requests into text-based raw pricing requests, for example, and other types of client devices 20(1)-20(n) can also be used. In other examples, raw pricing requests originate from the client devices 20(1)-20(n) but are received by the NLU service device 12 from intermediary trading desk or salesperson devices, for example, that provide a chart or email interface for the client devices 20(1)-20(n).

A raw pricing request can be for pricing for a particular financial instrument (e.g., OTC derivatives), which is based on certain included parameters. An exemplary raw pricing request received at the NLU service device 12 from a chat communication channel is illustrated below:

receive fixed @ 1.213 v 3mlib 06/09/16-06/09/21 cme cleared current index 0.95083 100M Other types and/or numbers of raw pricing requests can also be used. If the NLU service device 12 determines in step 302 that a raw pricing request has been received, then the Yes branch is taken to step 304.

In step 304, the NLU service device 12 applies one or more of the model(s) of the learning module in order to analyze unstructured data in the raw pricing request to identify predicates or key value(s). The key value(s) can be associated with dates, dollar amounts, currency types, particular clearing houses, a type of financial instrument, and/or any other type of parameter required to generate a price quote for a financial instrument. The key value(s) can be determined from the unstructured data based a set of words included in the unstructured data, a sequence of the words, a proximity in time of the raw pricing request to one or more other raw pricing requests or other types of communications received from the client device(s) 20(1)-20(n), or a pattern matching technique, for example, and other methods of analyzing the unstructured data of the raw pricing requests to identify key value(s) can also be used.

In step 306, the NLU service device 12 transforms the raw pricing request, based on the key value(s) identified in step 304, into a price quote request that includes structured data. The transformation can include extracting the key value(s) from extraneous information in the unstructured data and reformatting the key value(s) based on a predefined structure. Accordingly, the resulting price quote request corresponds to a format or structure expected by one of the pricing applications 18(1)-18(n) hosted by one the pricing server devices 16(1)-16(n).

An exemplary transformation of the raw pricing request shown above is illustrated below:
{"Caps":[ ], "Swaps":[{"spn":"12345678","clearinghouse": "CME","ccy":"USD","notional":"100M","start":"06/09/16","end":"06/09/21","coupon":"1.213%","fixbasis":"30/360","fixfreq":"S","flt index":"3MLIB","spread":"0", "fltbasis":"30/360","fltfreq":"Q"}]}
In this example, the raw pricing request is transformed based on a JavaScript Object Notation (JSON) format, although other types of formats can also be used in other examples.

In step 308, the NLU service device stores captured data and updates the model(s) of the learning module 30. The captured data can relate to the received unstructured data and/or the structured data of the price quote request or any other information useful for training and updating the model (s), although other types of data can be stored and/or used by the learning module 30. The captured data can be stored in the memory 24 of the NLU service device 12 or in other locations, such as an external persistent data store (e.g., a Hadoop file system or a document storage system, such as mongo db).

In one example, the captured data can include feedback provided by intermediaries to which the structured price quote requests are provided, such as dealers or trade desks, for example. In this example, the structured price quote requests are provided to an intermediary for review prior to being sent to one of the pricing application(s) 18(1)-18(n), as described and illustrated in more detail later. The review can include modifying portion(s) of the transformed raw price quote to improve accuracy, such as parameter(s) of the structured data corresponding to one or more of the key values identified in step 304.

Upon return of the modified transformed raw price quote, the NLU service device 12 can identify those parameter(s) that were manually altered and store associated training records in the memory 24 that can be used to inform and optimize the model(s) of the learning module 30. In other examples, other types and/or numbers of techniques can be used to facilitate updating of the model(s), including those techniques used during the supervised training as described and illustrated in more detail earlier with reference to step 300 of FIG. 3.

In step 310, the NLU service device 12 outputs the price quote request resulting from the transformation of the raw pricing request to one of the pricing applications 18(1)-18(n) hosted by one of the pricing server devices 16(1)-16(n). The price quote request can be output using JSON and/or HTTP and via the communication network(s) 14(1), although other types and methods of communicating the price quote requests to one of the pricing application(s) 18(1)-18(n) configured to generate a price quote can also be used. Accordingly, any third party client device with access to the NLU service device 12 via a communication network can advantageously utilize this technology to facilitate automated price quoting for financial instruments.

Subsequent to outputting the price quote request to the one of the pricing application(s) 18(1)-18(n), or if the NLU service device 12 determines in step 302 that a raw pricing request has not been received, then the No branch is taken and the NLU service device 12 proceeds to step 312. In step 312, the NLU service device 12 determines whether a price quote response has been received from one of the pricing server devices 16(1)-16(n). If the NLU service device 12 determines that a price quote response has not been received, then the No branch is taken back to step 302. Accordingly, the NLU service device 12 in this example effectively waits for a raw pricing request or a price quote response to be received.

However, if the NLU service device 12 determines in step 312 that a price quote response has been received, then the Yes branch is taken to step 314. In step 314, the NLU service device 12 returns the price quote response to one of the client devices 20(1)-20(n) from which a corresponding raw pricing request was previously received in step 302. Accordingly, the NLU service device 12 can persist information (e.g., via a cookie) regarding requesting ones of the client devices 20(1)-20(n) in order to correlate price quote responses and direct them appropriately, although other methods of managing price quote responses can also be used in other examples.

The price quote response is received in this example from one of the pricing application(s) 18(1)-18(n) executing on one of the pricing server devices 16(1)-16(n), and includes a price quote for a financial instrument according to the key value(s) of the price quote request output in step 310. Subsequent to returning the price quote response to one of the client devices 20(1)-20(n), the NLU service device 12 proceeds back to step 302 in this example.

Optionally, the NLU service device 12 can receive and store feedback data in some examples regarding the provided price quote response. The feedback data can include whether the price quote response resulted in a transaction with a user of one of the client device(s) (also referred to as a hit) or price quote responses provided by other financial institutions to the same raw pricing request. Accordingly, the stored feedback data can be provided to the pricing service devices 16(1)-16(n) and used by the pricing application(s) 18(1)-18(n) to calculate margin or markup or optimize a hit rate with respect to future price quote requests.

Figure 4:
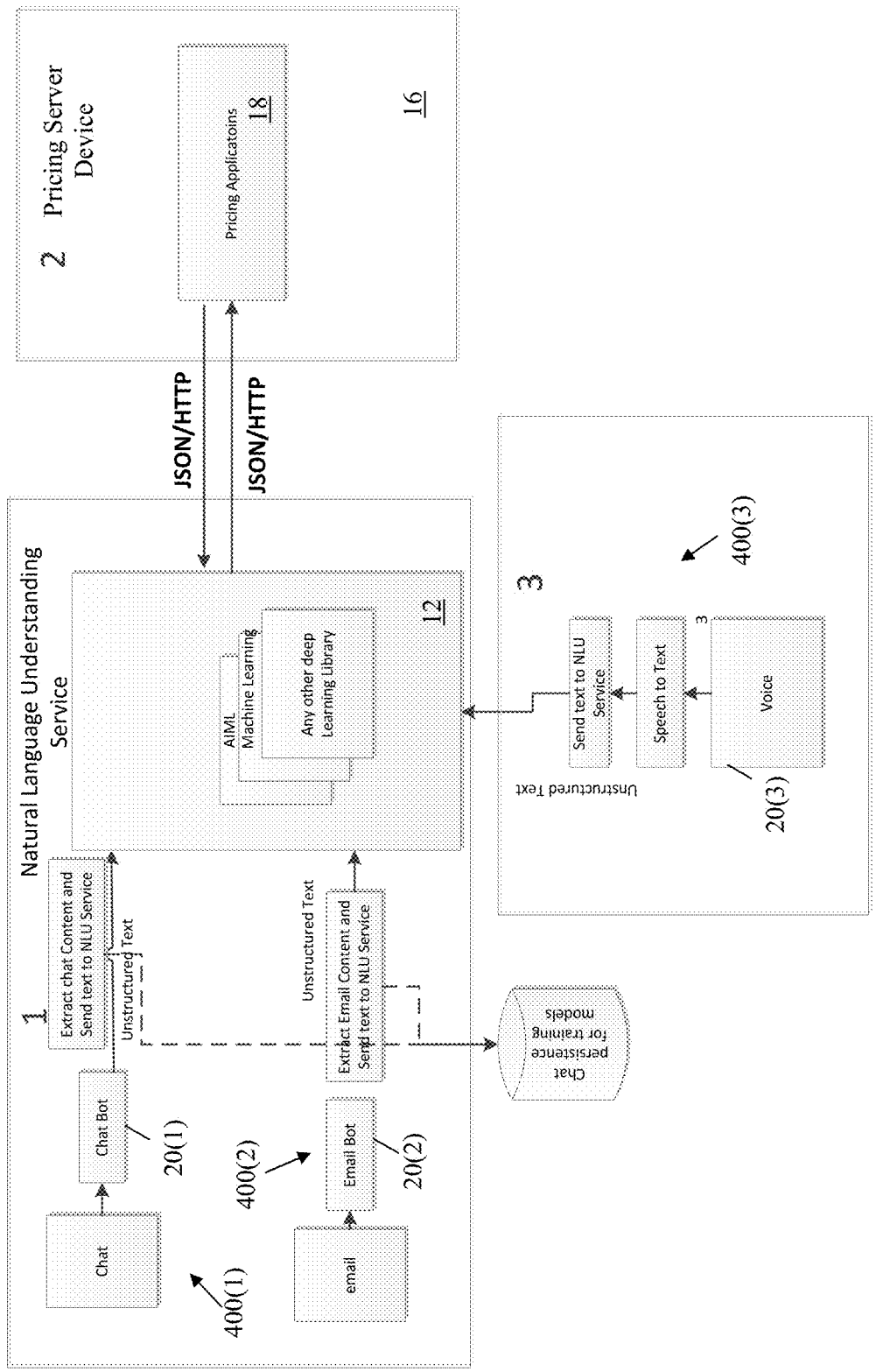
FIG. 4 is a flow diagram of an exemplary method for automatically generating structured pricing models from unstructured multi-channel communications.

Referring more specifically to FIG. 4, a flow diagram of processes 1, 2, and 3 of an exemplary method for automatically generating structured pricing models from unstructured multi-channel communications is illustrated. In this example, raw pricing requests are received from communication channels 400(1), 400(2), and 400(3) associated with chat and e-mail bot client devices 20(1) and 20(2) as well as a voice client device 20(3), respectively. In the case of the chat and e-mail bot client devices 20(1) and 20(2), respectively, chat and e-mail content is extracted and the text of the chat and e-mail content is sent to the NLU service device 12 as unstructured data. Similarly, the voice client device 20(3) converts received speech to text, and the text is sent to the NLU service device 12 as unstructured data.

The NLU service device 12 in this example then analyzes and transforms the unstructured data associated with the raw price quote requests based on the application of model(s) and artificial intelligence and/or machine and/or deep learning techniques, for example. The unstructured data associated with the raw pricing requests is transformed to generate well-formed price quote requests that include structured data according to requirements of pricing applications hosted by the pricing server device 16. Accordingly, the NLU service device 12 transmits the price quote requests via communication network(s) using JSON/HTTP to the pricing applications 18 and receives price quote responses from the pricing applications 18, which are communicated back to the requesting client devices 20(1), 20(2), and 20(3).

With this technology, raw pricing requests can be processed automatically irrespective of the type of communication channel from which they are received. Accordingly, turn-around time for customized price quote requests for financial instruments can be significantly reduced with this technology, thereby increasing hit ratios and customer satisfaction. Additionally, this technology facilitates more efficient processing of raw pricing requests such that more requests can be handled in periods of high volume.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for automatically generating structured pricing models from unstructured multi-channel communications implemented by one or more natural language understanding (NLU) service devices, the method comprising:

maintaining at least one data store of a plurality of raw pricing requests in two or more different formats and corresponding transaction outcomes that includes feedback data relating to the raw pricing requests, each of the raw pricing requests including unstructured data relating to a respective price quote for acquiring a corresponding financial instrument, the feedback data including data indicating whether the respective price quote resulted in a completed transaction with an affiliated financial institution;

automatically generating at least one model relating to one or more key values associated with the raw pricing requests based on the plurality of raw pricing requests;

training the at least one model using at least one machine learning technique, the training including automatically changing the at least one model based on information included in the at least one data store;

receiving a plurality of first raw pricing requests from two or more different types of communication channels and via one or more communication networks;

automatically analyzing the unstructured data of the first raw pricing requests using the at least one model to identify one or more first key values associated with the first raw pricing requests;

automatically transforming the first raw pricing requests based on the identified first key values into price quote requests comprising structured data in one or more particular formats required by one or more pricing applications hosted by one or more pricing server devices;

outputting the price quote requests to at least one intermediary that includes a dealer and a trade desk for review;

outputting the price quote requests and the feedback data to one or more of the pricing applications via another one or more communication networks;

determining, via the pricing application, a hit rate based on whether the raw pricing requests resulted in a completed transaction with an affiliated financial institution; and determining, via the pricing application, a margin and a markup price for the price quote requests based on the feedback data, the margin and the markup price calculated to increase the hit rate.

2. The method as set forth in claim 1, further comprising receiving the first raw pricing requests from one or more client devices, obtaining one or more quote responses to the price quote requests from the one or more of the pricing applications, and returning the quote responses to the client devices in response to the first raw pricing requests.

3. The method as set forth in claim 1, further comprising updating the at least one model based on received feedback data regarding a result of the transformation.

4. The method as set forth in claim 1, wherein the unstructured data of each of the first raw pricing requests is analyzed based on one or more of a set of words included therein, a sequence of the words, a proximity in time to one or more of the firstraw pricing requests, or a pattern matching technique in order to identify the first key values.

5. A natural language understanding (NLU) service device, comprising memory comprising programmed instructions stored thereon and one or more processors configured to be capable of executing the stored programmed instructions to:

maintain at least one data store of a plurality of raw pricing requests in two or more different formats and corresponding transaction outcomes that includes feedback data relating to the raw pricing requests, each of the raw pricing requests including unstructured data relating to a respective price quote for acquiring a corresponding financial instrument, the feedback data including data indicating whether the respective price quote resulted in a completed transaction with an affiliated financial institution;

automatically generate at least one model relating to one or more key values associated with the raw pricing requests based on the plurality of raw pricing requests;

train the at least one model using at least one machine learning technique, the training including automatically changing the at least one model based on information included in the at least one data store;

receive a plurality of first raw pricing requests from two or more different types of communication channels and via one or more communication networks;

automatically analyze the unstructured data of the first raw pricing requests using the at least one model to identify one or more first key values associated with the first raw pricing requests;

automatically transform the first raw pricing requests based on the identified first key values into price quote requests comprising structured data in one or more particular formats required by one or more pricing applications hosted by one or more pricing server devices;

output the price quote requests to at least one intermediary that includes a dealer and a trade desk for review;

output the price quote requests and the feedback data to one or more of the pricing applications via another one or more communication networks;

determine, via the pricing application, a hit rate based on whether the raw pricing requests resulted in a completed transaction with an affiliated financial institution; and determine a margin and a markup price for the price quote requests based on the feedback data, the margin and the markup price calculated to increase the hit rate.

6. The NLU service device as set forth in claim 5, wherein the one or more processors are further configured to be capable of executing the stored programmed instructions to receive the first raw pricing requests from one or more client devices, obtain one or more quote responses to the price quote requests from the one or more of the pricing applications, and return the quote responses to the client devices in response to the first raw pricing requests.

7. The NLU service device as set forth in claim 5, wherein the one or more processors are further configured to be capable of executing the stored programmed instructions to update the at least one model based on received feedback data regarding a result of the transformation.

8. The NLU service device as set forth in claim 5, wherein the unstructured data of each of the first raw pricing requests is analyzed based on one or more of a set of words included therein, a sequence of the words, a proximity in time to one or more of the raw pricing requests, or a pattern matching technique in order to identify the first key values.

9. A non-transitory machine readable medium having stored thereon instructions for automatically generating structured pricing models from unstructured multi-channel communications comprising executable code which when executed by one or more processors, causes the one or more processors to:

maintain at least one data store of a plurality of raw pricing requests in two or more different formats and corresponding transaction outcomes that includes feedback data relating to the raw pricing requests, each of the raw pricing requests including unstructured data relating to a respective price quote for acquiring a corresponding financial instrument, the feedback data including data indicating whether the respective price quote resulted in a completed transaction with an affiliated financial institution;

automatically generate at least one model relating to one or more key values associated with the raw pricing requests based on the plurality of raw pricing requests;

train the at least one model using at least one machine learning technique, the training including automatically changing the at least one model based on information included in the at least one data store;

receive a plurality of first raw pricing requests from two or more different types of communication channels and via one or more communication networks;

automatically analyze the unstructured data of the first raw pricing requests using the at least one model to identify one or more first key values associated with the first raw pricing requests;

automatically transform the first raw pricing requests based on the identified first key values into price quote requests comprising structured data in one or more particular formats required by one or more pricing applications hosted by one or more pricing server devices;

output the price quote requests to at least one intermediary that includes a dealer and a trade desk for review;

output the price quote requests and the feedback data to one or more of the pricing applications via another one or more communication networks;

determine, via the pricing application, a hit rate based on whether the raw pricing requests resulted in a completed transaction with an affiliated financial institution; and determine a margin and a markup price for the price quote requests based on the feedback data, the margin and the markup price calculated to increase the hit rate.

10. The non-transitory machine readable medium as set forth in claim 9, wherein the executable code when executed by the processors further causes the one or more processors to receive the first raw pricing requests from one or more client devices, obtain one or more quote responses to the price quote requests from the one or more of the pricing applications, and return the quote responses to the client devices in response to the firstraw pricing requests.

11. The non-transitory machine readable medium as set forth in claim 9, wherein the executable code when executed by the processors further causes the one or more processors to update the at least one model based on received feedback data regarding a result of the transformation.

12. The non-transitory machine readable medium as set forth in claim 9, wherein the unstructured data of each of the first raw pricing requests is analyzed based on one or more of a set of words included therein, a sequence of the words, a proximity in time to one or more of the first raw pricing requests, or a pattern matching technique in order to identify the first key values.

13. The method as set forth in claim 1, wherein the at least one machine learning technique includes at least one of a deep learning process relating to the training of the at least one model and an artificial intelligence markup language process relating to the training of the at least one model.

14. The NLU service device as set forth in claim 5, wherein the at least one machine learning technique includes at least one of a deep learning process relating to the training of the at least one model and an artificial intelligence markup language process relating to the training of the at least one model.

15. The non-transitory machine readable medium as set forth in claim 9, wherein the at least one machine learning technique includes at least one of a deep learning process relating to the training of the at least one model and an artificial intelligence markup language process relating to the training of the at least one model.

* * * * *